United States Patent
Torres (10) Patent No.: US 7,212,148 B1
(45) Date of Patent: May 1, 2007

(54) APPARATUS FOR JAMMING INFRARED ATTACK UNIT USING A MODULATED RADIO FREQUENCY CARRIER

(75) Inventor: Alfonso R. Torres, Dayton, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 150 days.

(21) Appl. No.: 11/099,071

(22) Filed: Apr. 5, 2005

(51) Int. Cl.
*G01S 7/38* (2006.01)

(52) U.S. Cl. .......................... 342/13; 342/14; 342/15; 342/52; 342/54

(58) Field of Classification Search ............ 342/13–15, 342/52, 54; 455/1
See application file for complete search history.

(56) References Cited

U.S. PATENT DOCUMENTS

| | | | |
|---|---|---|---|
| 2,885,543 A | 5/1959 | Williams | |
| 3,044,061 A * | 7/1962 | Richmond et al. ............. | 342/15 |
| 3,836,968 A | 9/1974 | Schillreff | |
| 4,149,166 A * | 4/1979 | Null ............................. | 342/13 |
| 4,354,419 A * | 10/1982 | Patterson ..................... | 89/1.11 |
| 4,928,104 A | 5/1990 | Schaffer | |
| 4,990,920 A | 2/1991 | Sanders, Jr. | |
| 5,378,155 A | 1/1995 | Eldridge | |
| RE35,553 E | 7/1997 | Li | |
| 5,673,049 A | 9/1997 | Kitchen | |
| 5,703,314 A | 12/1997 | Meeker | |
| 5,767,954 A | 6/1998 | Laakmann | |
| 5,777,572 A | 7/1998 | Janusas | |
| 6,267,039 B1 | 7/2001 | Czarnecki | |
| 6,480,140 B1 | 11/2002 | Rosefsky | |
| 6,707,052 B1 | 3/2004 | Wild et al. | |
| 6,980,151 B1 * | 12/2005 | Mohan ........................ | 342/13 |
| 7,154,430 B1 * | 12/2006 | Buehler et al. ............... | 342/13 |
| 7,155,179 B1 * | 12/2006 | Rothenberg .............. | 455/114.2 |
| 2002/0154024 A1 | 10/2002 | Stevenson et al. | |
| 2004/0119631 A1 | 6/2004 | Sanders et al. | |
| 2005/0275582 A1 * | 12/2005 | Mohan ........................ | 342/13 |
| 2006/0249009 A1 * | 11/2006 | Rubin ......................... | 89/1.11 |
| 2006/0284050 A1 * | 12/2006 | Busse et al. ............. | 250/203.1 |

* cited by examiner

*Primary Examiner*—John B. Sotomayor
(74) *Attorney, Agent, or Firm*—RatnerPrestia

(57) ABSTRACT

A countermeasure system for jamming an attack unit is provided. The attack unit receives an infrared carrier signal for detection of a target under attack and is vulnerable to countermeasures from another infrared carrier signal modulated by a predetermined modulating signal. The countermeasure system includes a radio frequency source for generating a radio frequency carrier signal, a modulator for modulating the radio frequency carrier signal using the predetermined modulating signal, and a antenna for transmitting the modulated radio frequency signal towards the attack unit.

20 Claims, 10 Drawing Sheets

APPARATUS FOR JAMMING INFRARED ATTACK UNIT USING A MODULATED RADIO FREQUENCY CARRIER

FIELD OF THE INVENTION

This invention relates to a countermeasure system, and more particularly, to a system for jamming an infrared attack unit which receives an infrared carrier signal for detection of a target and is vulnerable to another infrared carrier signal modulated by a predetermined modulating signal. The system uses a radio frequency carrier signal modulated by the predetermined modulating signal to jam the attack unit.

BACKGROUND OF THE INVENTION

Man portable air defense systems (MANPADS) which are shoulder launched missile systems typically include heat seeking or infrared (IR) missiles and are a threat to aircraft and other types of transportation. IR missiles include an IR detector, which allows the IR missile to detect and track a target. More particularly, IR missiles detect the heat signature (i.e., infrared light) which is emitted by hot structures, for example, engines of the aircraft, to track the aircraft in an attack. However, IR missiles are vulnerable to high powered IR carrier signals which blind the IR detector of the incoming IR missile. In addition, IR missiles are vulnerable to lower powered IR carrier signals that are modulated using certain modulating signals that confuse its tracking system and cause the tracking system to track a false target.

Conventional countermeasures to an IR missile threat include jamming systems which confuse or blind the IR missile using either IR lamps and/or IR lasers. These jamming systems transmit either a high powered IR carrier signal to blind the IR detector of the incoming IR missile or, otherwise, transmit a lower powered IR carrier signal modulated with a modulating signal to confuse the IR detector of the incoming missile.

The IR lamp and/or IR laser jamming systems are heavy, complex, consume a great deal of power, and require significant space. Real estate in airborne platforms, as well as in most other transportation is typically at a premium or may not be available. Further, systems using IR lasers include precise pointing and tracking devices, which are hard to implement and produce drag on an aircraft platform.

What is needed is a system that may jam IR missiles and that may have reduced size, weight and power (SWAP) requirements. Also needed is a system with a reduced time for pointing and having increased reliability and reduced drag on the aircraft platform.

SUMMARY OF THE INVENTION

The present invention overcomes the shortcomings of the conventional art.

The present invention is embodied in a countermeasure system for jamming an attack unit for which the attack unit receives an infrared carrier signal for detection of a target under attack and is vulnerable to countermeasures from another infrared carrier signal modulated by a predetermined modulating signal. The countermeasure system may include a radio frequency (RF) source for generating a RF carrier signal, a modulator for modulating the RF carrier signal using the predetermined modulating signal, and a antenna for transmitting the modulated RF signal towards the attack unit.

The present invention may include alternate embodiments of the countermeasure system. One alternate embodiment of the countermeasure system may include a detector unit for identifying characteristics of the attack unit, a storage unit for storing predetermined modulating signals and predetermined RF carrier signals, and a selector unit for selecting a predetermined modulating signal and a predetermined RF carrier signal according to the identified characteristics of the attack unit, a modulator for modulating the selected RF carrier signal using the selected modulating signal, and a transmitter for transmitting the modulated RF carrier signal towards the attack unit.

The present invention is embodied in a method of jamming an attack unit used to attack a target, the attack unit being vulnerable to an infrared carrier signal modulated by a modulating signal. The method may include identifying the modulating signal used with the infrared carrier signal to jam the attack unit, generating a radio frequency (RF) carrier signal, modulating the RF carrier signal using the identified modulating signal, and transmitting the modulated RF signal towards the attack unit.

BRIEF DESCRIPTION OF THE DRAWINGS

The invention is best understood from the following detailed description when read in connection with the accompanying drawing. It is emphasized that, according to common practice, various features of the drawings are not to scale. On the contrary, the dimensions of various features are arbitrarily expanded or reduced for clarity. Included in the drawings are the following figures.

DETAILED DESCRIPTION OF THE INVENTION

As used herein, infrared frequency carrier signals refer to signals with a frequency in the range of about 500 GHz to 500 THz. RF (RF) carrier signals refer to signals with a frequency in the range of about 1 to 30 GHz.

A countermeasure system of the present invention is contemplated for use against an attack unit attacking a target. In the exemplary embodiments, the target is an aircraft and the attack unit is a missile. However, other types of targets and attack units are possible. For example, the target may be any structure that has an infrared signature whether the structure is moving or stationary. The attack unit may be any projectile such as a missile with an explosive capability or without the explosive capability.

Embodiments of the present invention use a selected frequency of an RF carrier signal modulated by a modulating signal typically used with IR carrier signals to provide jamming of attack units that detect and track IR signatures.

Figure 1:
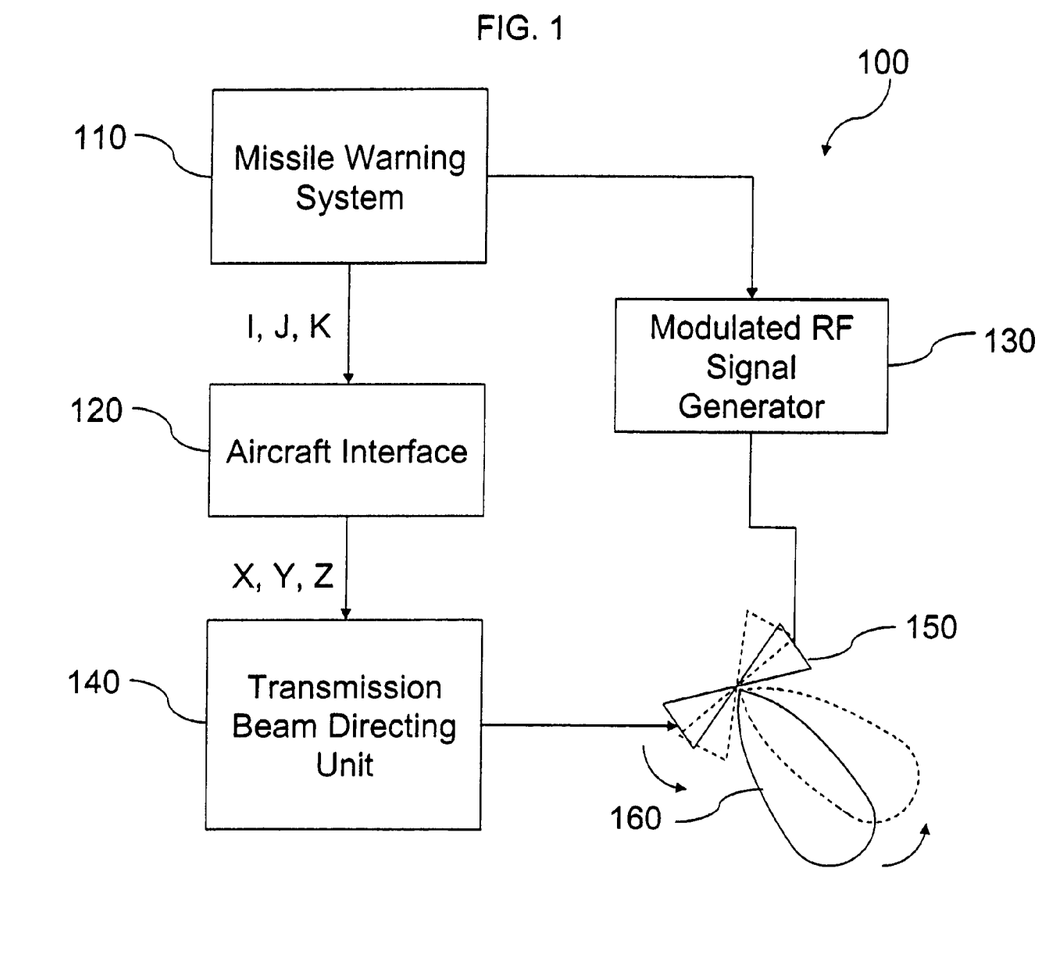
FIG. 1 is a block diagram illustrating a countermeasure system using a modulated RF carrier signal for jamming an attack unit, such as a missile, according to the exemplary embodiment of the present invention.

Referring to FIG. 1, there is shown a block diagram illustrating a countermeasure system 100 using a RF carrier signal for jamming an attack unit 410 (FIG. 4) according to an exemplary embodiment of the present invention. The countermeasure system 100 may include a Missile Warning System (MWS) 110, an aircraft interface 120 of an aircraft 400 (i.e., a target) (see FIG. 4), a modulated RF signal generator 130, a transmission beam directing unit 140 and an antenna 150. The MWS 110 may detect and determine a position of an incoming attack unit 410 (e.g., a ground-to-air missile or an air-to-air missile, among others). The MWS 110 may provide i, j, k vector information that describes the position of the incoming attack unit 410 relative to the position of the MWS 110 (i.e., using MWS sensors (not shown)).

By tracking a trajectory of the attack unit 410, the MWS 110 may discriminate between a threatening attack unit and non-threatening attack unit. When the MSW 110 detects a threatening attack unit, the MWS 110 may automatically alert the pilot with a warning signal, may provide the countermeasure system 100 with precise data on the trajectory of the attack unit 410, and may automatically activate transmission of a predetermined modulated RF carrier signal to divert the incoming attack unit 410 away from the aircraft 400.

The MWS 110 may detect different spectral frequencies including, for example, IR and ulraviolet frequencies for radiation signatures of the incoming attack unit 410. The MWS 110 may have a plurality of detectors that are installed around the aircraft 400 to provide complete coverage of the airspace around the aircraft 400. The MWS 110 after detecting an incoming attack unit 410, may provide information to various defensive systems (not shown) such as a flare ejection countermeasure system to engage in countermeasures to defeat the incoming attack unit 410.

The MWS 110 may be desirably mounted on the aircraft 400 (i.e., the target of the attack unit 410) but, otherwise, may be located with other equipment (e.g., system platforms such as Airborne Warning and Control System (AWACS), land-based systems and/or other air-based systems within proximity of the aircraft 400. The i, j, k vector information, which may include the relative position of the attack unit 410 to the MWS 110, may be provided to the aircraft interface 120. The aircraft interface 120 may take the i, j, k vector information and transform the information into coordinates x, y and z with respect to an earth based coordinate system (i.e., a terrestrial frame of reference). The location of the aircraft 400 may be provided by a guidance system (not shown), a global positioning sensor (GPS) (not shown) or an enhanced GPS inertial system that determines the absolute position of the aircraft 400.

The absolute coordinate information of the attack unit 410 may be used by the aircraft interface 120 to control the transmission beam directing unit 140. That is, absolute coordinate information may be provided to the transmission beam directing unit 140 to steer a direction of the antenna 150 to form a transmission beam 160 toward the incoming attack unit 410. The transmitter (i.e. the modulated signal generator 130) may then transmit the predetermined modulated RF carrier signal toward the attack unit 410.

The countermeasure system 100 may use a conformal antenna having an array of individually controlled antenna elements as the antenna 150, and each of the antenna elements may be arranged on a curved surface of the antenna. The overall radiation pattern of the conformal array results from a spatial superposition of radiation patterns from all of the individually controlled antenna elements. With such a conformal antenna, drag on the aircraft 400 may be reduced because the conformal antenna does not protrude from the surface of the aircraft 400, thus reducing or substantially eliminating any drag experienced by, for example, turrets used with IR or laser transmitters.

It is within the scope of the present invention to simplify control over the conformal antenna, control over individual antenna elements may be grouped based on the precision needed for beam steering to maintain the attack unit within the main lobe of the radiation pattern of the modulated RF carrier signal.

The MWS 110 detects the presence of the incoming attack unit 410 and if it is determined that the attack unit 410 represents a threat to the aircraft 400, the MWS 110 may output a signal to the modulated RF signal generator 130. The modulated RF signal generator 130 may then generate a predetermined, modulated RF carrier signal for transmission.

Such a predetermined modulation signal is determined according to vulnerabilities of attack units to IR carrier signals having certain modulation signals (i.e., amplitude, phase, or spin by carrier modulation techniques used with IR carrier signals). That is, the predetermined modulation signal may include at least one of an amplitude modulated radio carrier signal, a frequency modulated radio carrier signal, or a spin modulated radio carrier signal. For example, an attack unit may use amplitude modulation, such as conical scan, of an IR carrier signal to lock on to a target. This same attack unit may be vulnerable to an inverse conical scan, superimposed on the IR carrier which would cause the attack unit to lose lock. The present invention uses the same inverse conical scan (amplitude modulation) to modulate an RF carrier to prevent the attack unit from locking onto the target.

The RF modulation may be chosen in a manner that the signals induced in the missile guidance system is of such a nature as to misguide the missile. It is expected that the RF modulation chosen has the same or substantially the same results as a conventional IR jamming signal.

The inventor has discovered that, for example, the attack unit 410 that detects IR carrier signals that employ amplitude modulation may be particularly vulnerable to RF carrier signals that are modulated with similar modulating signals at or close to the spin frequency (i.e., the rotational frequency) of the attack unit 410. In addition, the attack unit 410 that detects IR carrier signals employing frequency modulation, may be particularly vulnerable to RF carrier signals that are modulated with spin by carrier modulating signals. As another example, an attack unit 410 that detect IR carrier signals employing reticule systems for detection of an IR carrier signal, may be particularly vulnerable to IR carrier signals with a combination of these modulations. (i.e., modulating signals at or close to the spin frequency and spin by carrier modulating signals). The inventor has discovered that these same types of modulations may be used to modulate an RF signal (instead of an IR signal) and make the same attack unit vulnerable to this modulated RF carrier signal.

Moreover, an attack unit 410 may be particularly susceptible to an RF carrier signal that is at or close to the missile body resonance (MBR) frequency. By transmitting a modulated RF carrier signal with a frequency at or near the MBR frequency, optimum jamming may occur. This reduces the amount of flux density of the modulated RF carrier signal needed to confuse the tracking system of the attack unit 410. A frequency may be considered near the MBR frequency if the frequency is within ±5% of the MBR frequency. That is, by determining the resonance frequency or a range of carrier frequencies which include the resonance frequency for a particular identified missile class, optimum jamming may occur.

By predetermining a modulated RF signal which may include a sequence of different modulation segments (i.e., time segments), there is a higher probability that the attack unit 410 may be jammed, thereby causing the attack unit 410 to miss the target aircraft 400. Thus, a plurality of predetermined modulated RF signal segments may be used such that each predetermined modulated RF signal segment may be designated to jam a different attack unit to improve the possibly of jamming the specific incoming attack unit 410 that is attacking the aircraft 400.

The one or more predetermined modulated RF signal segments (time segments) may include a common or substantially common RF carrier or, otherwise, a different frequency RF carrier may be used in each of these time segments. By varying the frequency of the RF carrier in different time segments, it may be possible to optimize each segment for an attack unit with a particular missile body resonance frequency.

The one or more predetermined modulated RF signal segments may be either 2 modulated RF signal segments or 3 modulated RF signal segments. The modulated RF signal segments may be chosen according to an estimated interception time of the incoming attack unit 410 with the aircraft 400.

The MWS 110 may further detect a position of the attack unit 410 and the transmission beam directing unit 140 may direct the transmission beam 160 towards the attack unit 410 based on the detected position of the attack unit 410. By tracking (e.g., determining the position, velocity, acceleration and angle) of the incoming attack unit 410, the transmission beam directing unit 140 may steer the transmission beam 160 to lock the modulated RF carrier signal onto the incoming attack unit 410. The attack unit 410 may be maintained within the beam width of the transmitted modulated RF carrier signal.

Moreover, detection of the attack unit 410 by the MWS 110 may be passive. That is, the detectors of the MWS 110 may only receive signals without any transmission of signals.

In one embodiment the beam width of the transmitted modulated RF carrier signal is wider than that of a conventional modulated IR carrier signal. Beam width refers to the angle between the half-power (3-dB) points of a main lobe of the antenna 150.

The antenna 150 may transmit the modulated RF carrier signal to induce a flux density on the attack unit 410 sufficient to produce a deception signal in the attack unit 410 at a predetermined range from the target. Moreover, as the beam width of the RF modulated signal from the antenna 150 increases, a power level transmitted by the antenna 150 to induce a sufficient deception signal in the attack unit 410 also increases.

The predetermined modulating signal may have a frequency in a range of about 1 Hz to 10 kHz and, more preferably in the range of about 30 Hz to 400 Hz. Moreover, the predetermined modulating signal may have a duty cycle in the range of 30%–70%.

The RF carrier signal may be in a range of about 1 GHz to 4 GHz. Moreover, the RF carrier signal may be either a continuous wave (CW) or may have a duty cycle in a range of about 40% to 100%.

For example, the predetermined modulated RF carrier signal may be spin modulated using a modulating signal at about 100 hertz with a 50% duty cycle. That is, a CW RF carrier may be chopped 50 times a second with about equal intensity when it is chopped to produce a jamming signal.

A variety of modulation depths, carrier frequencies and modulation frequencies may be used. The ranges given are illustrative for one class of missile.

The predetermined modulating signal may be spin by carrier modulated using a composite signal of a first signal modulated with a second signal. The first signal may have a frequency in the range of about 500 Hz to 2000 Hz and the second signal may have a frequency in the range of about 30 Hz to 1000 Hz. That is, for example, a 1,200 Hz signal may be chopped by a 100 Hz signal and the composite signal may be superimposed on an RF carrier signal.

Figure 2:
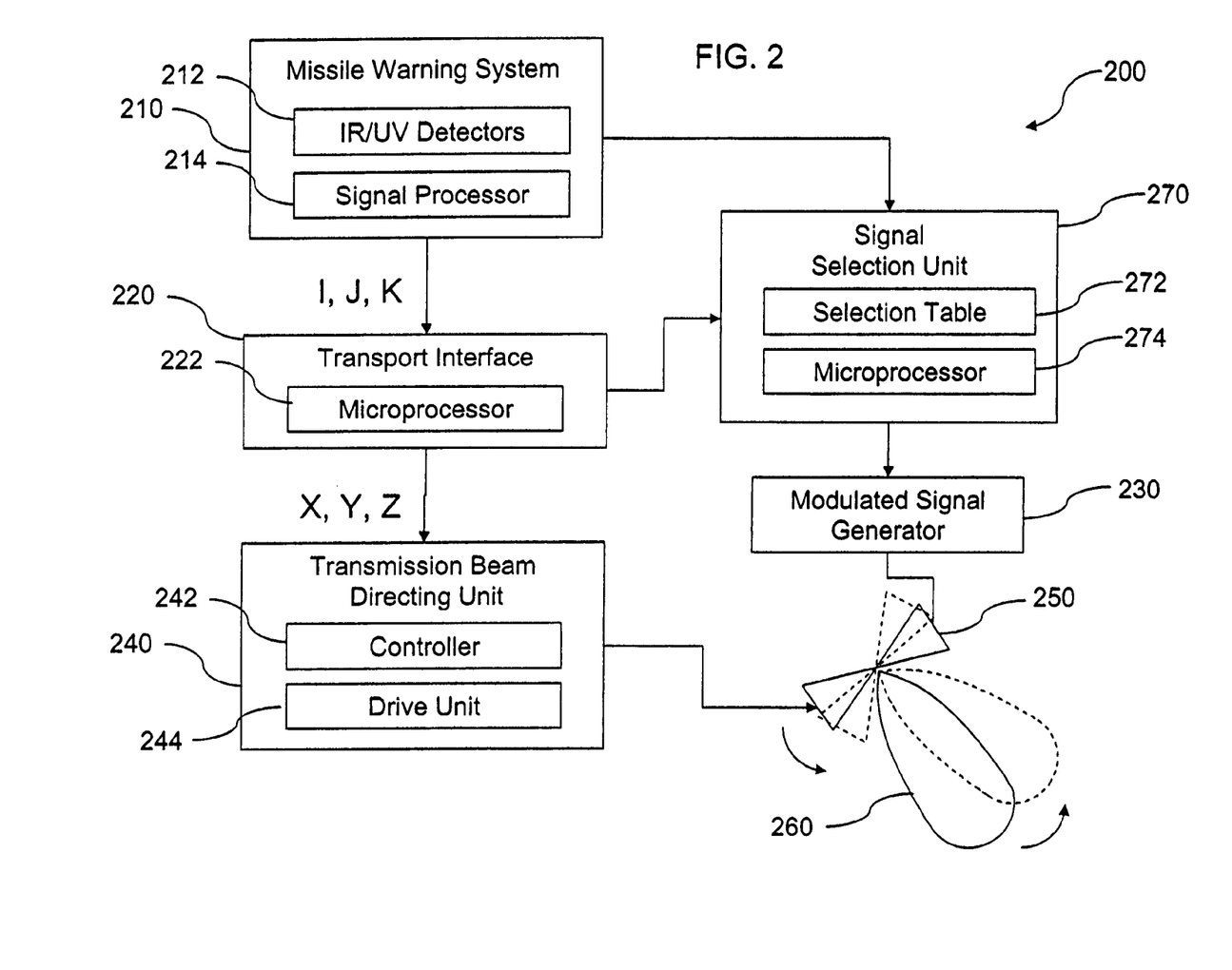
FIG. 2 is a block diagram illustrating a countermeasure system using a modulated RF carrier signal for jamming an attack unit, such as a missile, according to another exemplary embodiment of the present invention.

Referring now to FIG. 2, there is shown a block diagram illustrating another countermeasure system 200 using a RF carrier signal for jamming an attack unit 410 according to another exemplary embodiment of the present invention. The countermeasure system 200 may include a MWS 210, an aircraft interface 220 of an aircraft 400 (i.e., the target), a modulated RF signal generator (i.e., a transmitter) 230, a transmission beam directing unit 240, an antenna 250 and a signal selection unit 270. The MWS 210 may detect and determine a position of an incoming attack unit 410.

The MWS 210 includes a detection system 212 and a signal processor 214, and may provide to the aircraft interface 220, via the signal processor 214, i, j and k vector information describing a position of the incoming attack unit 410. Thus, the MWS 210 may discriminate between a threatening and non-threatening attack unit. When the MWS 210 detects a threatening attack unit, the MWS 210 may automatically alert the pilot with a warning signal. It may also provide an output signal to the signal selection unit 270 indicating the presence of the threatening attack unit 410.

The aircraft interface 220 may then determine the absolute position of the attack unit 410 so that the antenna 250 may be steered toward the attack unit 410.

The detection system 212 may detect different spectral frequencies including, for example, IR and ulraviolet frequencies for radiation signatures of the incoming attack unit 410. The detection system 212 may include a plurality of detectors that are disposed around the aircraft 400 to provide complete coverage of the airspace around the aircraft 400.

The signal processor 214 may receive signals from the detection system 212 and signal process the received signals to determine whether any attack units may be present in the airspace around the aircraft 400. If an attack unit 410 is present, the signal processor 214 determines whether the attack unit 410 may be a threat to the aircraft 400 (i.e., whether the attack unit 410 is on a track to either intercept the aircraft 400 or may come within a predetermined distance from the aircraft).

If it is determined that the attack unit 410 may be a threat, an output signal may be sent to the signal selection unit 270 and information regarding the attack unit 410 may be provided to other defensive systems, such as a flare ejection countermeasure system.

The MWS 210 may be desirably mounted on the aircraft 400 but, otherwise, may be located with other equipment (e.g., system platforms such as AWACS, land-based systems and/or other air-based systems within proximity of the aircraft 400. Moreover, detection of the attack unit 410 by the MWS 210 may be passive.

The i, j and k vector information may be received by a microprocessor 222 of the aircraft interface 220 and may transform the i, j and k information into coordinates x, y and z.

The location of the aircraft 400 may be provided by a guidance system (not shown), a global positioning sensor (GPS) (not shown) or an enhanced GPS inertial system that determines the absolute position of the aircraft 400.

The absolute coordinate information of the attack unit 410 may be used by the microprocessor 222 of the aircraft interface 220 to control the transmission beam directing unit 240. The transmission beam directing unit 240 includes a controller 242 and a drive unit 244. That is, absolute coordinate information may be provided to the controller 242 of the transmission beam directing unit 240 to steer the antenna 250. The controller 242 may direct the drive unit 244 to move the antenna 250 to form the transmission beam 260 toward the incoming attack unit 410. The modulated signal generator 230 (i.e., transmitter) may then transmit a modulated RF signal toward the attack unit 410. The drive unit 244 may be a mechanical drive to position the antenna 250.

The MWS 210 may determine a position of the attack unit 410 and the transmission beam directing unit 240 may direct the modulated RF carrier signal 260 (i.e., transmission beam) towards the attack unit 410 based on the detected position of the attack unit 410. By tracking (e.g., determining the position, velocity, acceleration and angle) the incoming attack unit 410, the transmission beam directing unit 240 may steer the antenna 250 to lock the transmission beam 260 onto the incoming attack unit 410.

The countermeasure system 200 may preferably use a conformal antenna having an array of antenna elements as the antenna 250 to reduce or substantially eliminate drag on the aircraft 400.

The microprocessor 222 of the aircraft interface 220 may optionally receive further information from the MWS 210 to analyze the signature (e.g., the intensity of the IR/UV spectrum at different wavelengths, the position, the velocity, the acceleration, the angle and/or the angular velocity) of the incoming attack unit 410. It may also determine the type of attack unit 410 to allow for selection and transmission toward the attack unit 410 of an appropriate modulated RF carrier signal.

Thus, the RF carrier signal modulated by the predetermined modulating signal which may initially be selected based on the presence of the threatening attack unit 410 may be changed. The signal selection unit 270 may receive from the microprocessor 222 information based on the detected signature for selection of a new modulated RF carrier signal to improve the effectiveness of RF jamming on the attack unit 410.

Since improved signature information is acquired as the incoming attack unit 410 approaches the aircraft, the analyzed information may be used to control the initial selection and/or to change the selection of the modulated RF carrier signal.

The signal selection unit 270 may include a selection table 272 and a microprocessor 274. The microprocessor 274 may select from the selection table 272 a record corresponding to a predetermined modulation signal to be transmitted to the attack unit 410 for jamming.

Figure 3A:
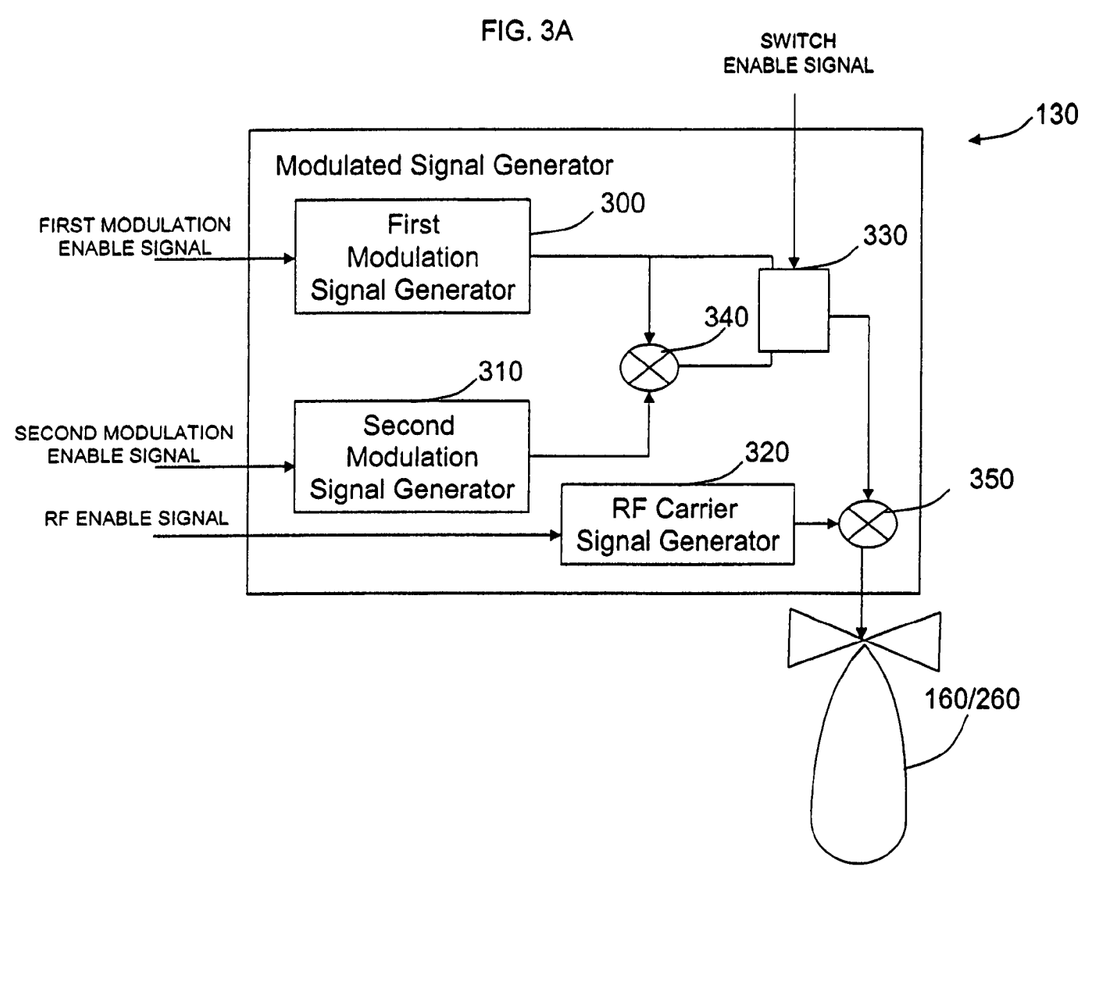
FIG. 3A is a block diagram illustrating a modulator used in the embodiment of the invention shown in FIG. 2.
Figure 3B:
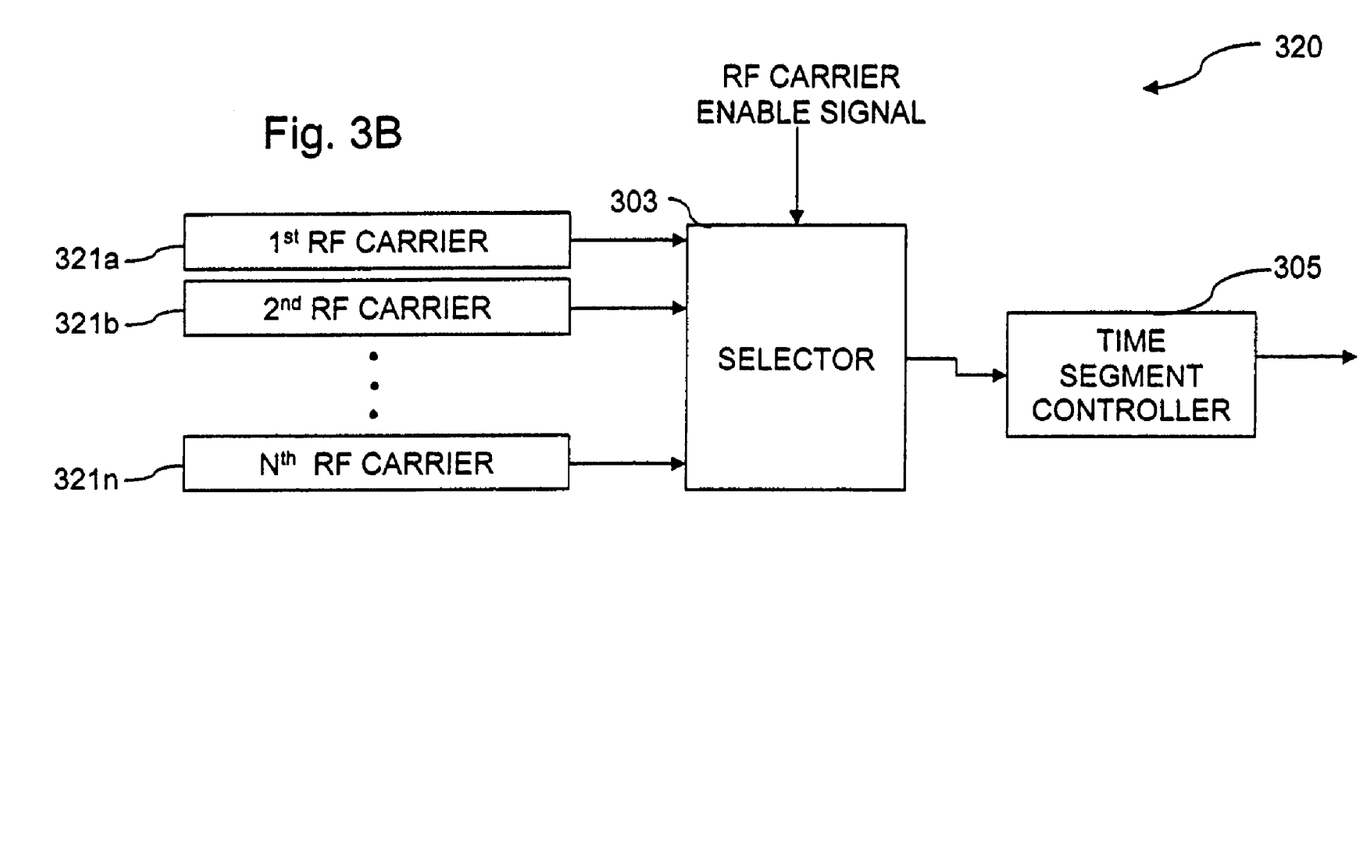
FIG. 3B is a block diagram illustrating a RF carrier signal generator used in the embodiment of the invention shown in FIG. 3A.
Figure 3C:
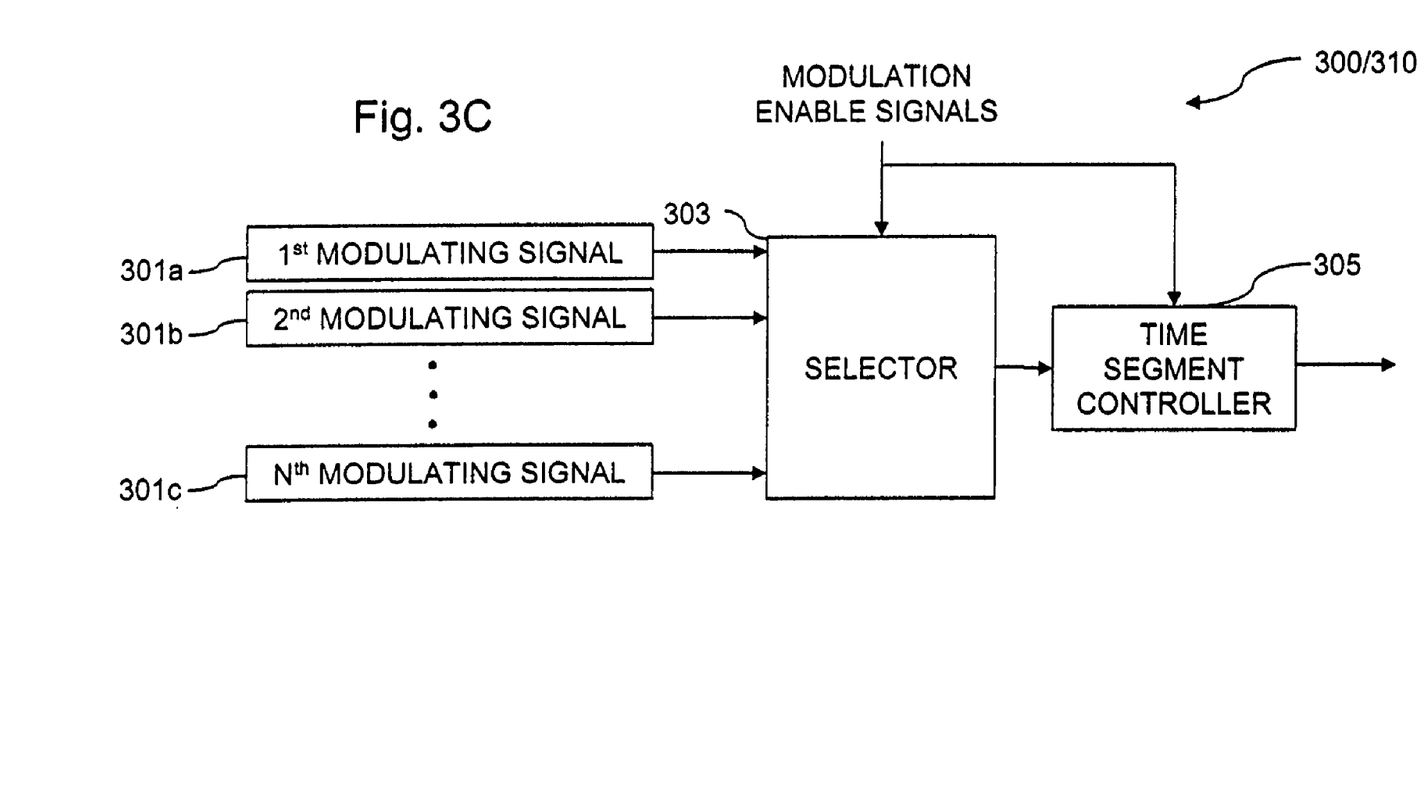
FIG. 3C is a block diagram illustrating a first or a second modulation signal generator used in the embodiment of the invention shown in FIG. 3A.

FIG. 3A shows a block diagram illustrating a modulator 230 used in the embodiment of the invention shown in FIG. 2. Moreover, FIGS. 3B and 3C show block diagrams illustrating a RF carrier signal generator 320 and first or second signal generators 300 and 310 used in the embodiment of the invention shown in FIG. 3A.

Referring now to FIG. 3A, the modulator 230 may include the first modulation signal generator 300, the second modulation signal generator 310, the RF carrier signal generator 320, a switching unit 330, a first mixer 340 and a second mixer 350. The first and second modulation signal generators 300 and 310 may receive modulation enable signals from the microprocessor 274 and may respectively generate first and second modulating signals. Moreover, the RF carrier signal generator 320 may receive an RF enable signal from the microprocessor 274 and may generate a RF carrier signal.

For example, the first and second modulation signal generators 300 and 310 may respectively generate a first signal, for example, a first square wave in a range of about 500 Hz to 2000 Hz and a second signal, for example, a second square wave in a range of about 30 Hz to 1000 Hz. The duty cycle of these square waves may desirably be in the range of about 30% to 70%. The first and second signals may be mixed by first mixer 340 to produce a composite signal.

The switching unit 330 may be controlled based on a switch enable signal from the microprocessor 274 to selective switch the input of the second mixer 350 between the composite signal and the first signal. When the composite signal is input to the second mixer 350, the RF carrier signal from the RF carrier signal generator 320 is modulated by the composite signal to generate a spin by carrier modulated RF carrier signal. When the first signal is input to the second mixer 350, the RF carrier signal from the RF carrier signal generator 320 is modulated by the first signal. The output of the second mixer 350 is transmitted by the antenna 250.

Referring now to FIG. 3B, the RF carrier signal generator 320 may include 1st though nth RF carrier signals 321*a*, 321*b* . . . 321*n*, a selector 303, and the time segment controller 305. A third modulation enable signal may be output by the microprocessor 274 to the selector 303 and time segment controller 305. The RF modulation enable signal may control the selector 303 for selection of the RF carrier signals 321*a*, 321*b* . . . 321*n* and the time segment controller 305 for sequencing and duration of each selected RF carrier signal 321*a*, 321*b* . . . 321*n* to be output from the RF carrier signal generator 320.

Referring now the FIG. 3C, the first modulation signal generator 300 or the second modulation signal generator 310 may include 1st though nth modulating signals 301*a*, 301*b* . . . 301*n*, the selector 303, and the time segment controller 305. A first modulation enable signal may be output by the microprocessor 274 to the selector 303 and time segment controller 305 to control the first modulation signal generator 300 and a second modulation enable signal may be output by the microprocessor 274 to control the second modulation signal generator 310. The first and second modulation enable signals may control the selector 303 for selection of the modulating signals 301a, 301b . . . 301n and the time segment controller 305 for sequencing and duration of each selected modulating signal 301a, 301b . . . 301n to be output from a respective modulation signal generator 300 or 310.

Although the modulator 230 is illustrated, it is contemplated that other types of modulators and other types of modulator configurations may be used such as frequency modulators, among others.

Since the predetermined modulated RF carrier signal may include a sequence of different modulations, there is a higher probability that the attack unit 410 may be jammed, thereby causing the attack unit 410 to miss the targeted aircraft 400. Each of the predetermined modulated RF signal segments (i.e., time segments) may be designated to jam a different attack unit to improve the possibly of jamming the specific incoming attack unit 410 that is attacking the aircraft 400.

The one or more predetermined modulated RF signal segments may include a common or substantially common RF carrier signal used in these segments or, otherwise, a different frequency RF carrier signal may be used in each of these signal segments. By varying the frequency of the RF carrier signal, it is possible to optimize a respective modulated RF signal segment for an attack unit 1410 with a particular missile body resonance frequency to improve jamming of the attack unit 410.

The one or more predetermined modulated RF signal segments may be either 2 modulated RF signal segments or 3 modulated RF signal segments (i.e., 2 or 3 time segments). The number of segments may be chosen according to an estimated interception time of the incoming attack unit 410.

Figure 4:
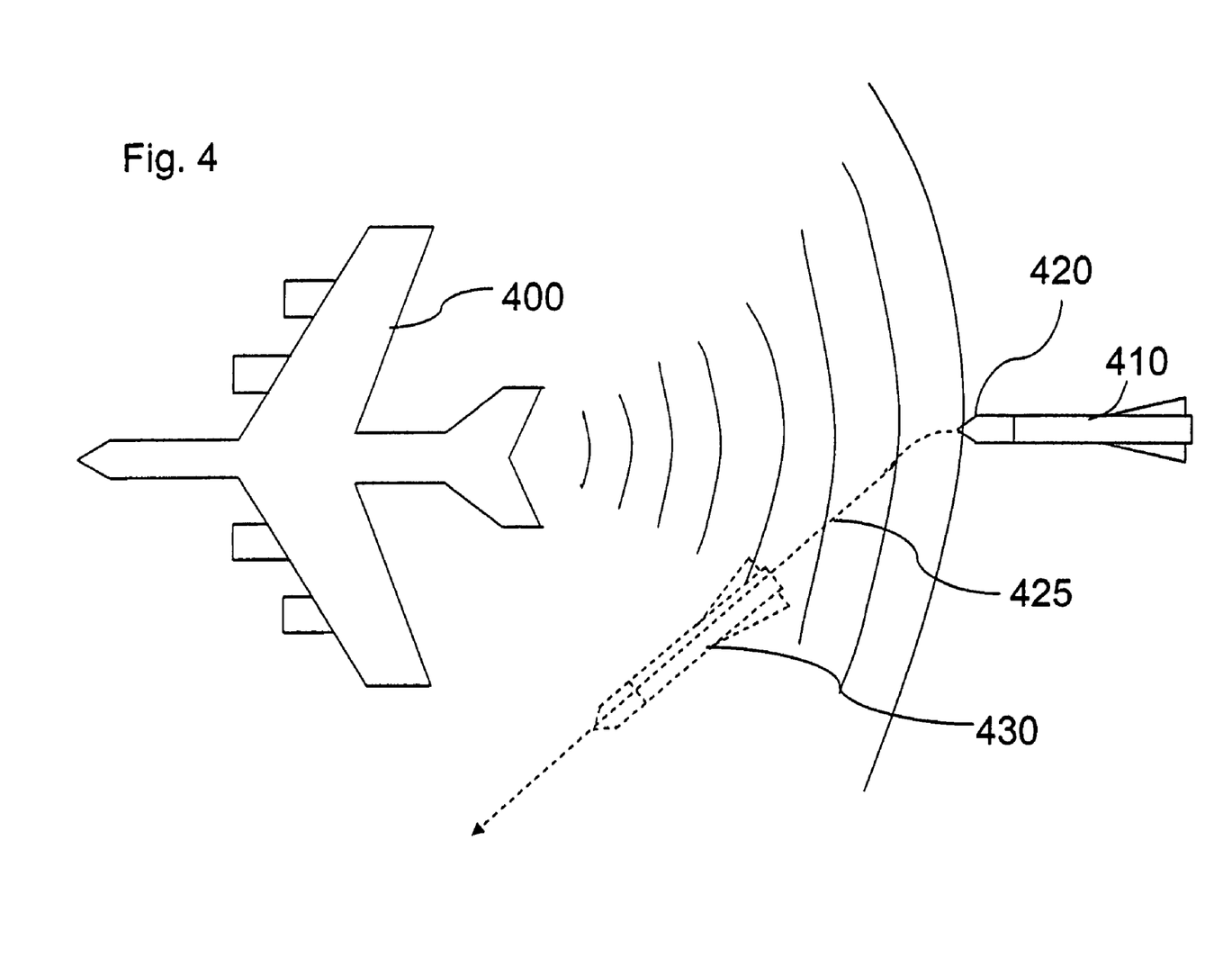
FIG. 4 is a schematic diagram illustrating an aircraft under attack by an incoming attack unit (i.e., an IR missile) and the incoming attack unit is being jammed by the countermeasure system illustrated in FIG. 1 or FIG. 2.

Referring now to FIG. 4, there is shown a schematic diagram illustrating an aircraft under attack by an incoming attack unit (i.e., an IR missile) and the incoming attack unit is being jammed by the countermeasure system illustrated in FIG. 1 or FIG. 2. The aircraft 400 is being attacked by the attack unit 410, the attack unit 410 may be part of a MANPAD system or, otherwise, may be any attack unit using an IR detector 420 to target the aircraft 400. At spaced locations around the aircraft 400 antennas 150 or 250 may transmit a modulated RF carrier signal towards the incoming attack unit 410, thereby causing the incoming attack unit 410 to lose track of the aircraft 400.

The modulated RF carrier signal transmitted by the antenna 150 or 250 includes a predetermined modulating signal. The predetermined modulating signal being known to jam at least selected attack units when used with an IR carrier signal. The modulated RF carrier signal may be received by the targeting system (not shown) of the attack unit 410 and may cause the attack unit to follow, for example, a dotted path 425 to position 430.

Figure 5:
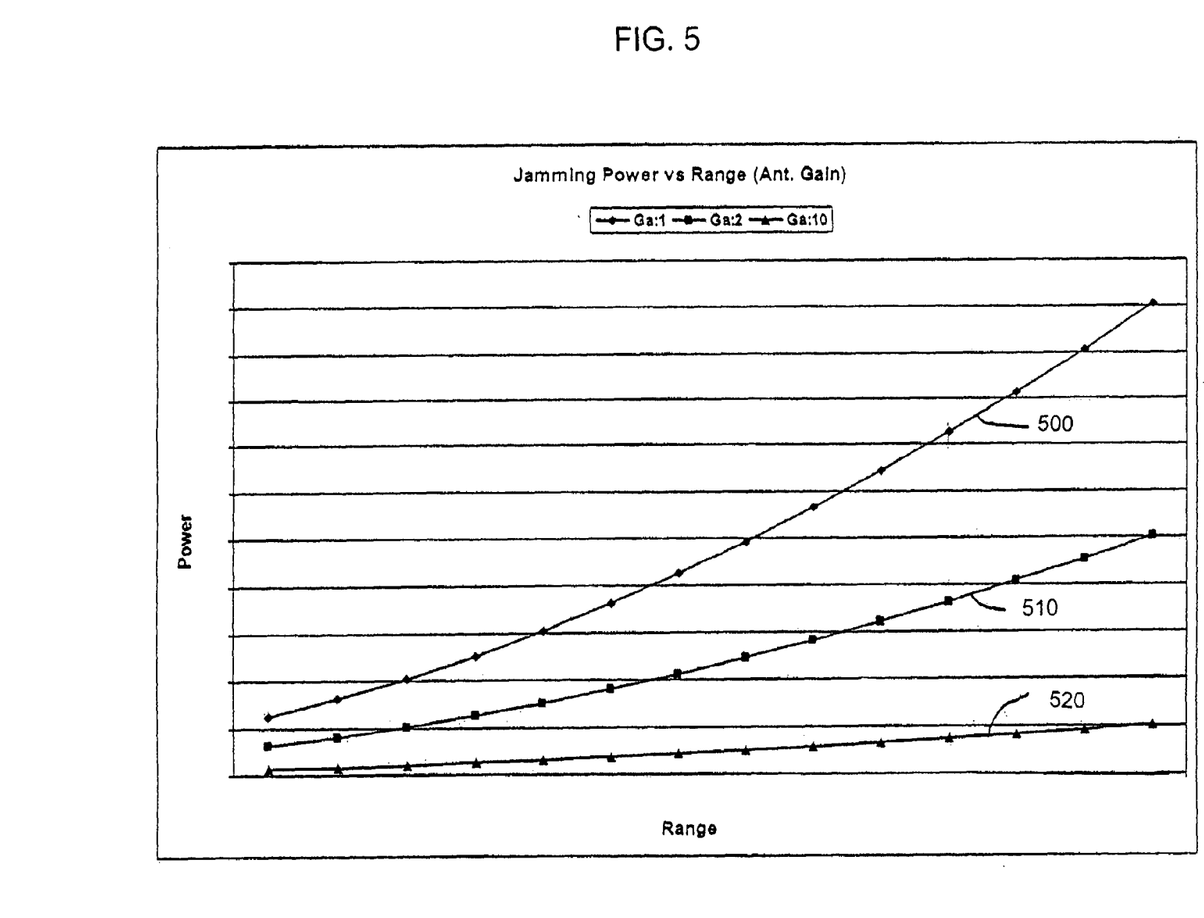
FIG. 5 is a graph illustrating a calculated RF jamming power as a function of distance from an antenna having various antenna gains.
Figure 6:
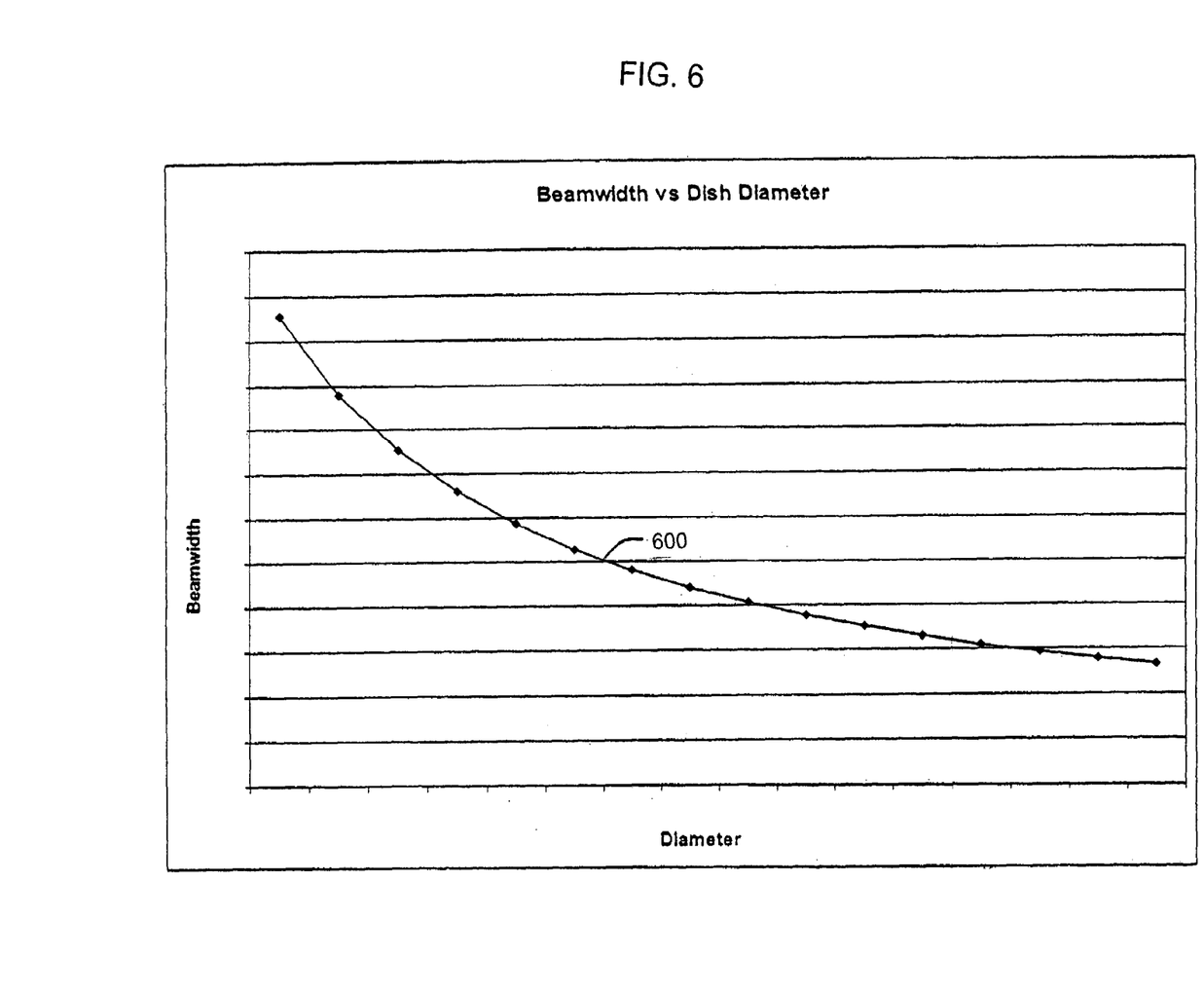
FIG. 6 is a graph illustrating the calculated beam width of a modulated RF carrier signal as a function of antenna diameter.
Figure 7:
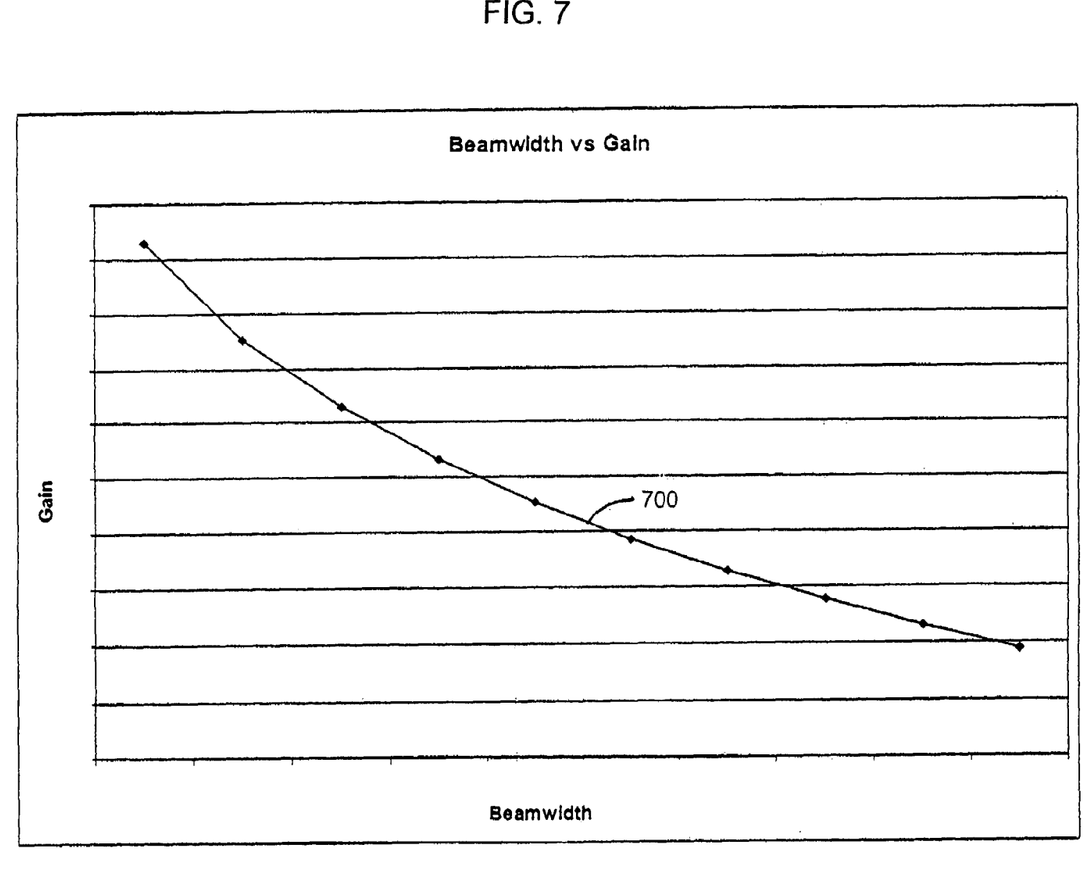
FIG. 7 is a graph illustrating the calculated beam width of a modulated RF carrier signal as a function of antenna gain.

FIGS. 5–7 are graphs illustrating design considerations regarding countermeasure system 100 or 200. FIG. 5 is a graph illustrating the calculated RF jamming power as a function of distance from the antenna 150 or 250 at various antenna gains. FIG. 6 is a graph illustrating the calculated antenna beam width as a function of diameter of the antenna 150 or 250. FIG. 7 is a graph illustrating the calculated beam width of an antenna as a function of antenna gain.

Referring to FIG. 5, the graph models the jamming power required for various gains of an antenna 150 or 250 as a function of distance for jamming the attack unit 410 using a modulated RF carrier signal. Antenna gain refers to the transmitters efficiency multiplied by its directionality. As the jamming distance increases the required power to jam the attack unit 410 also increases. Moreover, as the gain of the antenna increases the required power to jam the attack unit 410 at a given distance decreases. For example, when the attack unit 410 is at a given range, the power required to jam the attack unit 410 is one value for an antenna with a gain of 1 (see plot line 500), is about 500% of this value for an antenna with a gain of 2 (see plot line 510) and is about 100% of this value for an antenna with a gain of 10 (see plot line 520). The effective jamming range is a function of both power and gain of the antenna.

Referring to FIGS. 6 and 7, the graphs model beam width of an antenna as a function of antenna gain and as a function of dish diameter, respectively. For a given dish diameter, the beam width and gain are inversely proportional. Conventional laser and IR carrier countermeasure systems have a much narrower beam width (and higher gain) and require more complex pointing systems compared to embodiments of the present invention.

Figure 8:
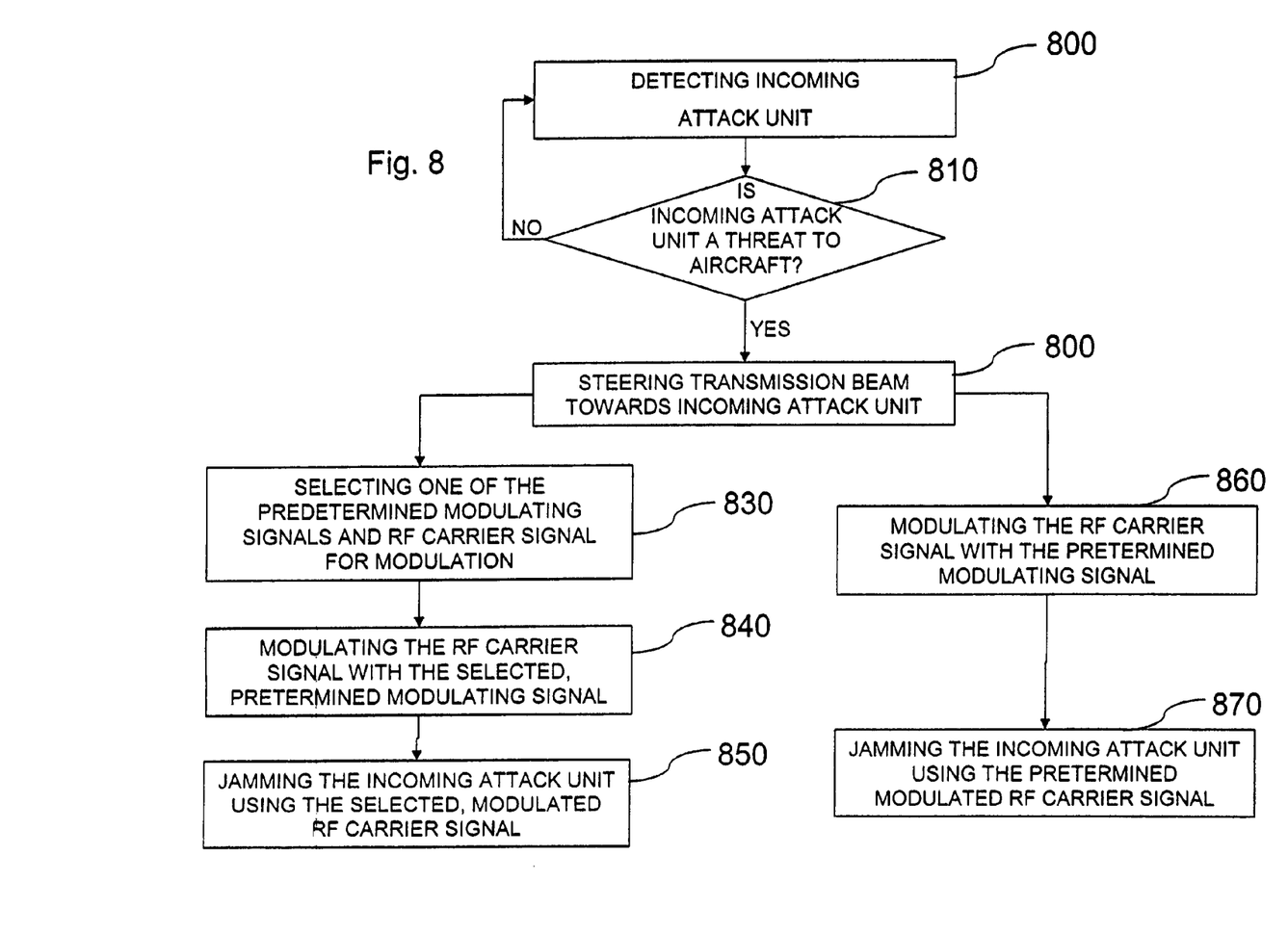
FIG. 8 is a flow chart illustrating a method of jamming an attack unit using the countermeasure system of FIG. 1 or FIG. 2.

FIG. 8 is a flow chart illustrating a method of jamming an attack unit 410 using the countermeasure system of FIG. 1 or FIG. 2.

An attack unit 410 which is in the vicinity of the aircraft 400 may be detected by the MWS 110 or 210 at operation 800, then the trajectory of the incoming attack 410 may be analyzed to determine whether the attack unit 410 is a threat to the aircraft 400 at operation 810.

If the attack unit 410 is determined to be a threat at operation 810, the antenna 150 or 250 is steered by the transmission beam directing unit 140 or 240 towards the incoming attack unit 410 at operation 820.

If the attack unit 410 is determined not to be a threat at operation 820, then the MWS 110 and 210 continues to monitor for any attack unit 410 which may be a threat to the aircraft 400 at operation 800.

In the countermeasure system 200, after the antenna 250 is steered towards the incoming attack unit 410 at operation 820, the signal selecting unit 270 selects one or ones of a plurality of predetermined modulating signals and selects one of a plurality of predetermined RF carrier signals at operation 830. After that, the selected RF carrier signal and the selected one or ones of the predetermined modulating signals are modulated by the transmitter/modulator 230 at operation 840. After modulation, the antenna 250 transmits the modulated RF carrier signal to jam the incoming attack unit 410 at operation 850.

In the counter measure system 100, after the antenna 150 is steered toward the incoming attack unit 410 at operation 820, an RF carrier signal is modulated by the predetermined modulating signal at operation 860 and the antenna 150 transmits a predetermined modulated RF carrier signal to jam the incoming attack unit 410 at operation 870.

The predetermined modulated RF carrier signal of the countermeasure system 100 or the selected, modulated RF carrier signal of the countermeasure system 200 causes the tracking system of attack unit 410 which is locked onto the aircraft 400 to become confused and thereby causes it to break its lock on the aircraft 400.

Although it is illustrated that operations 830 through 870 occur after the steering operation 820, it is contemplated that these operations may occur independent of the steering operation 820 and, thus, may occur anytime after the incoming attack unit 410 is determined to be a threat at operation 810

The embodiments of the present invention illustrated provide countermeasure systems that target specific RF carrier frequencies for which the attack units are vulnerable, require relatively low power to achieve the results compare to IR laser and IR lamp systems. The power for these countermeasure systems can be generated with existing power amplifiers so that reliability of the countermeasure systems is relatively improved as well.

Although the exemplary embodiments are illustrated using an exemplary aircraft as the target of an attack unit, numerous other targets are possible including vehicles such as trucks, tanks, helicopters, ships, trains or other common carrier transports, among others and fixed target such as buildings so long as these structures have IR signatures.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A countermeasure system for jamming an attack unit, wherein the attack unit receives an infrared carrier signal for detection of a target under attack and is vulnerable to countermeasures from another infrared carrier signal modulated by a predetermined modulating signal, the countermeasure system comprising:
   a detector unit for detecting the attack unit receiving the infrared carrier signal;
   a radio frequency source for generating a RF carrier signal;
   a modulator for modulating the RF carrier signal using the predetermined modulating signal; and
   a transmitter for transmitting the modulated RF signal towards the attack unit;
   wherein the infrared carrier signal is in the infrared region and the RF carrier signal is in an RF region of about 1 GHz to 4 GHz.

2. The countermeasure system according to claim 1, further comprising:
   a selecting unit for selecting the RF carrier signal and the predetermined modulating signal to produce the modulated RF signal for jamming the attack unit.

3. The countermeasure system according to claim 1, further comprising:
   a selecting unit for selecting one or more time segments for modulating the RF carrier signal for jamming the attack unit.

4. The countermeasure system according to claim 1, further comprising:
   a detection system for detecting a position of the attack unit; and
   a transmission directing unit for directing the modulated RF signal towards the attack unit based on the detected position by the detection system.

5. The countermeasure system according to claim 1, wherein the transmitter comprises an antenna, the antenna having a beam width in the range of 20° to 40°.

6. The countermeasure system according to claim 1, further comprising the modulated RF signal including a deception signal for jamming the attack unit at a predetermined distance from the target.

7. The countermeasure system according to claim 1, further comprising the predetermined modulating signal including a range of about 1 Hz to 10 kHz.

8. The countermeasure system according to claim 1, further comprising the predetermined modulating signal including a frequency in the range of about 30 Hz to 400 Hz and a duty cycle in a range of about 25% to 75%.

9. The countermeasure system according to claim 1, further comprising the RF carrier signal including a frequency at or near a body resonance frequency of the attack unit.

10. The countermeasure system according to claim 1, further comprising the predetermined modulating signal including spin by carrier modulation.

11. The countermeasure system according to claim 10, further comprising the predetermined modulating signal including a composite signal of a first signal having a frequency in a range of about 500 Hz to 2000 Hz modulated with a second signal having a frequency in a range of about 30 Hz to 1000 Hz.

12. The countermeasure system according to claim 3, further comprising each of the time segments includes a substantially common RF time segment which is modulated to produce the modulated RF signal.

13. The countermeasure system according to claim 3, further comprising each of the time segments includes a different respective RF time segment which is modulated to produce the modulated RF signal.

14. The countermeasure system according to claim 3, wherein the time segments comprise either 2 time segments or 3 time segments.

15. The countermeasure system according to claim 5, wherein the antenna comprises a conformal antenna which is mounted on the target and matches a shape of the target to prevent drag.

16. A countermeasure system for jamming an attack unit, wherein the attack unit receives an infrared carrier signal for detection of a target under attack and is vulnerable to countermeasures from another infrared carrier signal modulated by a predetermined modulating signal, the countermeasure system comprising:
   a detector unit for detecting the attack unit receiving the infrared carrier signal and identifying characteristics of the attack unit;
   a storage unit for storing predetermined modulating signals and predetermined RF carrier signals, and
   a selector unit for selecting a predetermined modulating signal and a predetermined RF carrier signal according to the identified characteristics of the attack unit;
   a modulator for modulating the selected RF carrier signal using the selected modulating signal; and
   a transmitter for transmitting the modulated RF carrier signal towards the attack unit,
   wherein the infrared carrier signal is in the infrared region and the RF carrier signal is in an RF region of about 1 GHz to 4 GHz.

17. The countermeasure system according to claim 16, wherein the identified characteristics comprise intensities at the one or more spectral frequencies, a position, a velocity, an angular and/or a velocity of the attack unit.

18. The countermeasure system according to claim 16, wherein:
   the detector comprises:
   a plurality of sensors spaced around the target for detecting a presence of the attack unit in a vicinity of the target, and
   the transmitter comprises:
   a plurality of antennas spaced around the target and at least one of the plurality of antennas is used to transmit the modulated RF carrier signal towards the attack unit.

19. A method for jamming an attack unit used to attack a target, wherein the attack unit receives an infrared carrier signal for detection of a target under attack and is vulnerable to countermeasures from another infrared carrier signal modulated by a predetermined modulating signal, the method comprising the steps of:

detecting the attack unit receiving the infrared carrier signal;

generating a radio frequency (RF) carrier signal in an RF region between 1 GHz and 4 GHz;

modulating the RF carrier signal using the identified modulating signal; and transmitting the modulated RF signal towards the attack unit.

20. The method according to claim 19, wherein the step of generating the RF carrier signal includes generating the RF carrier signal at or near a body resonance frequency of the attack unit.

* * * * *